(12) United States Patent
Lin

(10) Patent No.: US 7,988,013 B2
(45) Date of Patent: Aug. 2, 2011

(54) FLOW CONTROL DEVICE

(76) Inventor: Jih-Liang Lin, Shoufeng Shiang (TW)

( * ) Notice: Subject to any disclaimer, the term of this patent is extended or adjusted under 35 U.S.C. 154(b) by 351 days.

(21) Appl. No.: 12/410,476

(22) Filed: Mar. 25, 2009

(65) Prior Publication Data
US 2010/0243939 A1 Sep. 30, 2010

(51) Int. Cl.
*F16K 5/00* (2006.01)
(52) U.S. Cl. ........ 220/714; 222/542; 222/548; 222/556; 222/566; 251/287; 251/315.06; 251/352
(58) Field of Classification Search .................. 222/542, 222/544, 545, 548, 556, 566; 251/287, 315.01, 251/315.06, 352; 220/714
See application file for complete search history.

(56) References Cited

U.S. PATENT DOCUMENTS

| 1,430,313 | A | * | 9/1922 | Vlada Millity | 215/313 |
| 1,882,697 | A | * | 10/1932 | Aldridge | 222/545 |
| 2,030,696 | A | * | 2/1936 | Forster | 222/542 |
| 2,790,583 | A | * | 4/1957 | Kolenda | 222/554 |
| 2,805,801 | A | * | 9/1957 | Jacobs et al. | 222/545 |
| 6,705,482 | B2 | * | 3/2004 | Savitz et al. | 220/254.3 |
| 7,165,568 | B2 | * | 1/2007 | Kessell et al. | 137/68.3 |
| 2007/0045313 | A1 | * | 3/2007 | Holcomb et al. | 220/714 |

* cited by examiner

*Primary Examiner* — John Bastianelli
(74) *Attorney, Agent, or Firm* — Bacon & Thomas, PLLC

(57) ABSTRACT

A flow control device includes a hood, a ball valve, a sealing ring, and a handle. The ball valve is movably received in an interior receiving space of the hood and the ball valve is set in sealing engagement with the sealing ring. The ball valve and the handle located outside the hood are coupled together and are thus movable in unison with each other. The ball valve defines a flow passage. The hood forms a discharge opening. When installed on an opening of any kind of container, such as a PET bottle or a glass bottle, or an outlet tube of a water tank, by rotating the handle to move the ball valve, the flow passage can be selectively set in fluid communication with the discharge opening.

12 Claims, 13 Drawing Sheets

FLOW CONTROL DEVICE

TECHNICAL FIELD OF THE INVENTION

The present invention generally relates to control of liquid flow applicable to various container or liquid dispenser, and in particular to a flow control device that comprises a ball valve having a flow passage and a hood mounted to a container or an opening of a faucet to control liquid flow through the opening by closing/opening the flow passage.

DESCRIPTION OF THE PRIOR ART

A container, such as PET bottle, a glass bottle, or even a temperature preservation tank, which is commonly used to contain for example juice, soda, or wine, is provided with a flow passage that forms an opening or an outlet tube of the container or tank and that is often closed by a cap or a faucet. When the cap is removed or is properly rotated, or the faucet is switched on, liquid is allowed to dispense.

However, conventionally, the cap is mounted to the bottle mouth by means of threading engagement. Although excellent closing can be realized thereby, the threading engagement is not good for opening/closing operation with a single hand. Thus, for a user who is riding a bicycle, driving a car, or carrying an object with one hand, opening such a container to retrieve liquid from the container is generally very difficult with a single hand, making the use very inconvenient. On the other hand, a regular faucet is structured so that an external handle is operable to drive a water block member or a ball valve contained inside the faucet. However, the conventional faucet has a complicated structure that is constituted by numerous components/parts and the assembling is complicated and it cannot be used in the mouth of the above discussed container.

In view of the above problems, the present invention aims to provide a flow control device that provides a simply-structured external attachment that facilitates efficient installation on an opening or mouth of various container, such as a PET bottle having an externally-threaded mouth, a glass bottle having a mouth having an outer flange, or even a temperature preservation tank that has a dispensing outlet tube, whereby a single-hand operation can be realized to enhance convenience.

SUMMARY OF THE INVENTION

An objective of the present invention is to provide a flow control device that enhances the convenience of operation and prevent leakage of liquid.

Another objective of the present invention is to provide a flow control device that is applicable to various containers for the purpose of reducing the consumption of natural resources.

To achieve the above objectives, in accordance with the present invention, a flow control device is provided, comprising a hood, which has a hemispherical shape and internally forms an interior receiving space, the hood forming in a top thereof a discharge opening, the hood forming two arc positioning slots in an outer surface thereof on opposite sides of the discharge opening; a ball valve, which forms a flow passage extending through a center thereof, the ball valve having an outer surface forming two positioning bosses at two symmetric locations substantially perpendicular to the flow passage, the ball valve forming two retention hooks on opposite side of the flow passage to correspond to the arc positioning slots so that when the ball valve is received in the hood, the ball valve is located in the receiving space and the retention hooks project outward through the arc positioning slots; a sealing ring, which is set inside the hood and encloses the outer surface of the ball valve; and a handle, which is shaped to correspond to the hood and has a central portion forming two coupling holes for engaging the retention hooks of the ball valve that project out of the hood so as to allow the handle to move in unison with the ball valve.

To open, the handle is moved in a downward direction to have the ball valve driven by the handle and undergoing an angle limited rotation inside the hood, whereby the flow passage of the ball valve is set in communication with the discharge opening of the hood to allow the liquid contained in a container or a liquid outlet tube to be dispensed off. On the other hand, to close, the handle is moved in an opposite direction to cause the flow passage to be out of alignment with the discharge opening of the hood (or even perpendicular thereto) and with the outer surface of the ball valve being seated by the sealing ring to ensure a completely leak-free condition, the closing operation is done. The operation is simple and easy and is completely leak free. Further, the hood of the present invention can be mounted to the mouth of various containers or an opening of a liquid outlet tube by means of treading, fastening, and tight fitting, so that it can replace the mouth cap that is originally mounted to the mouth or a faucet. The installation is simple an easy and repeated process of development can be eliminated that reduce the consumption of resources.

The foregoing objective and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
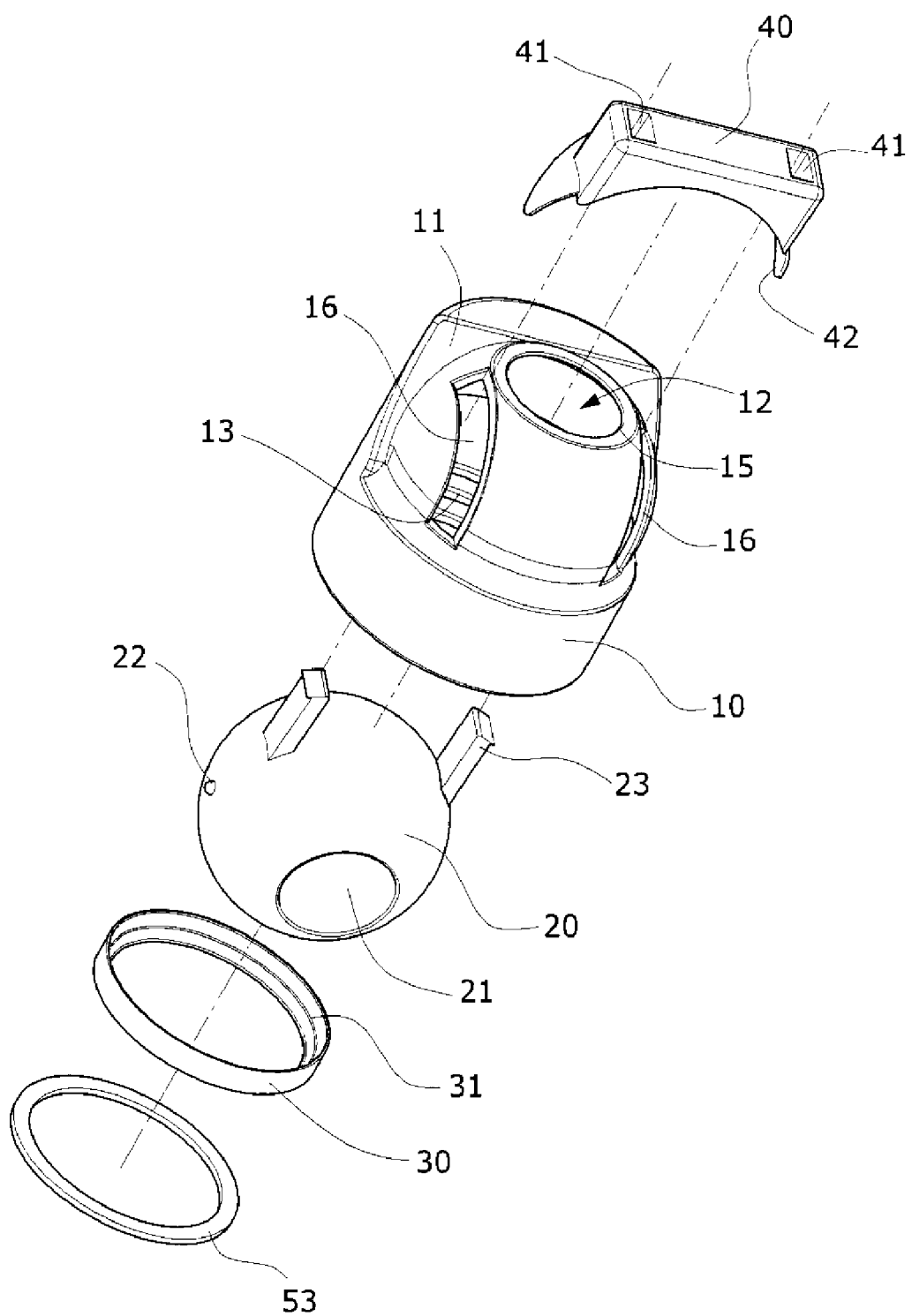
FIG. 1 is an exploded view of a preferred embodiment of the present invention.
Figure 2:
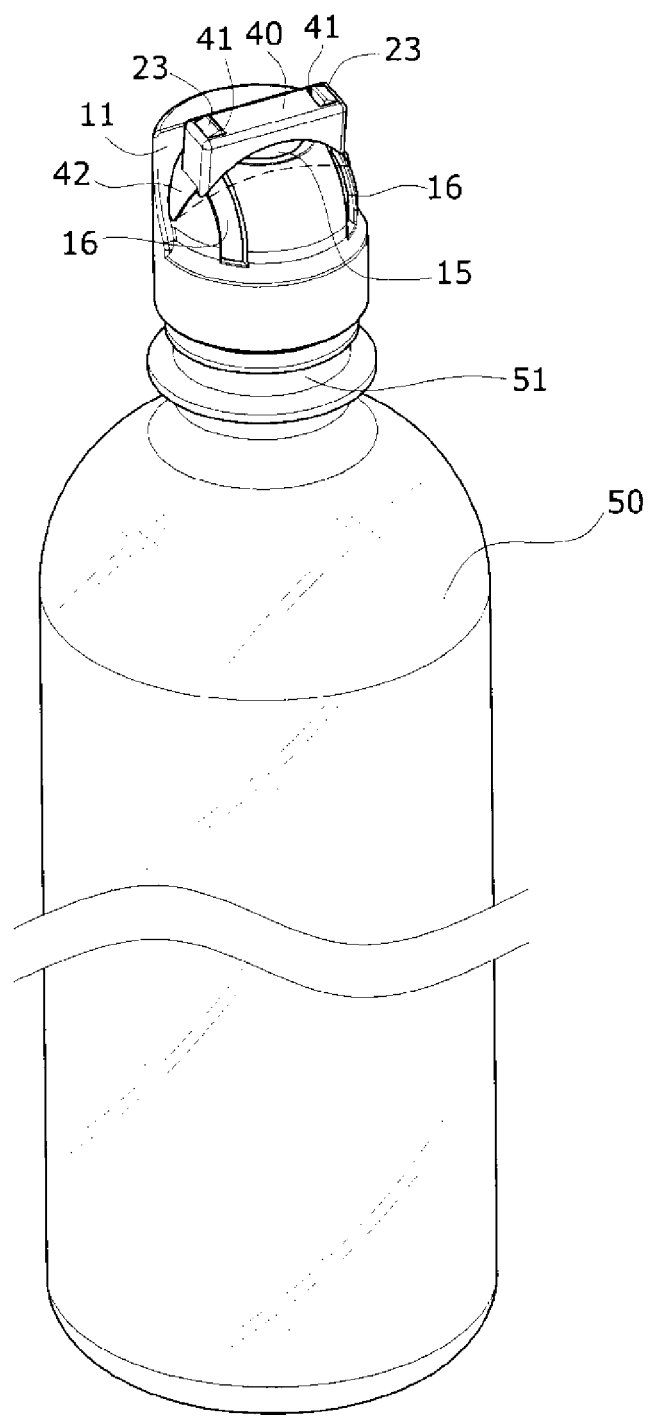
FIG. 2 is a perspective view of the preferred embodiment of the present invention when installed on a container.
Figure 3:
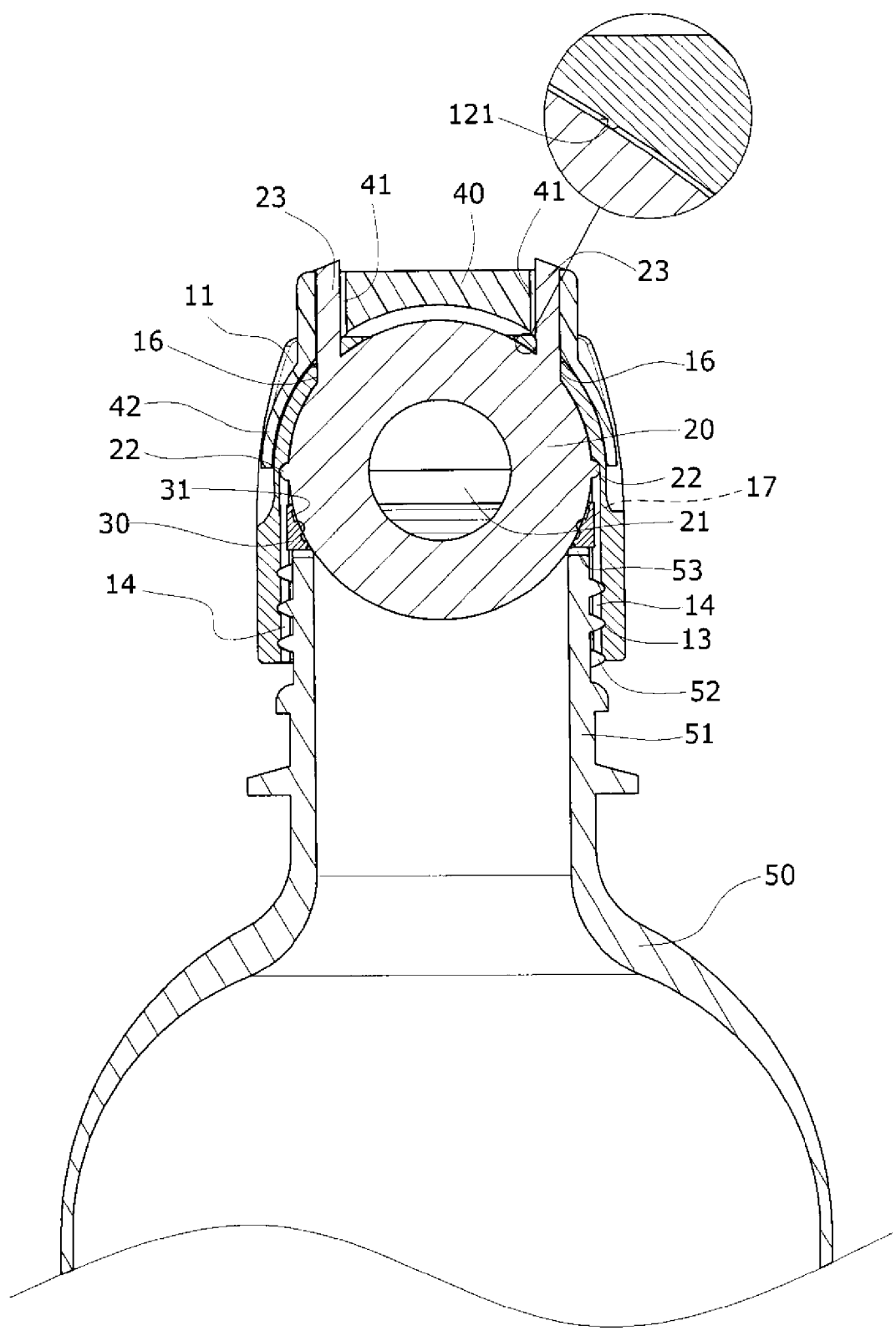
FIG. 3 is a cross-sectional view of the preferred embodiment of the present invention when installed on the container.
Figure 4:
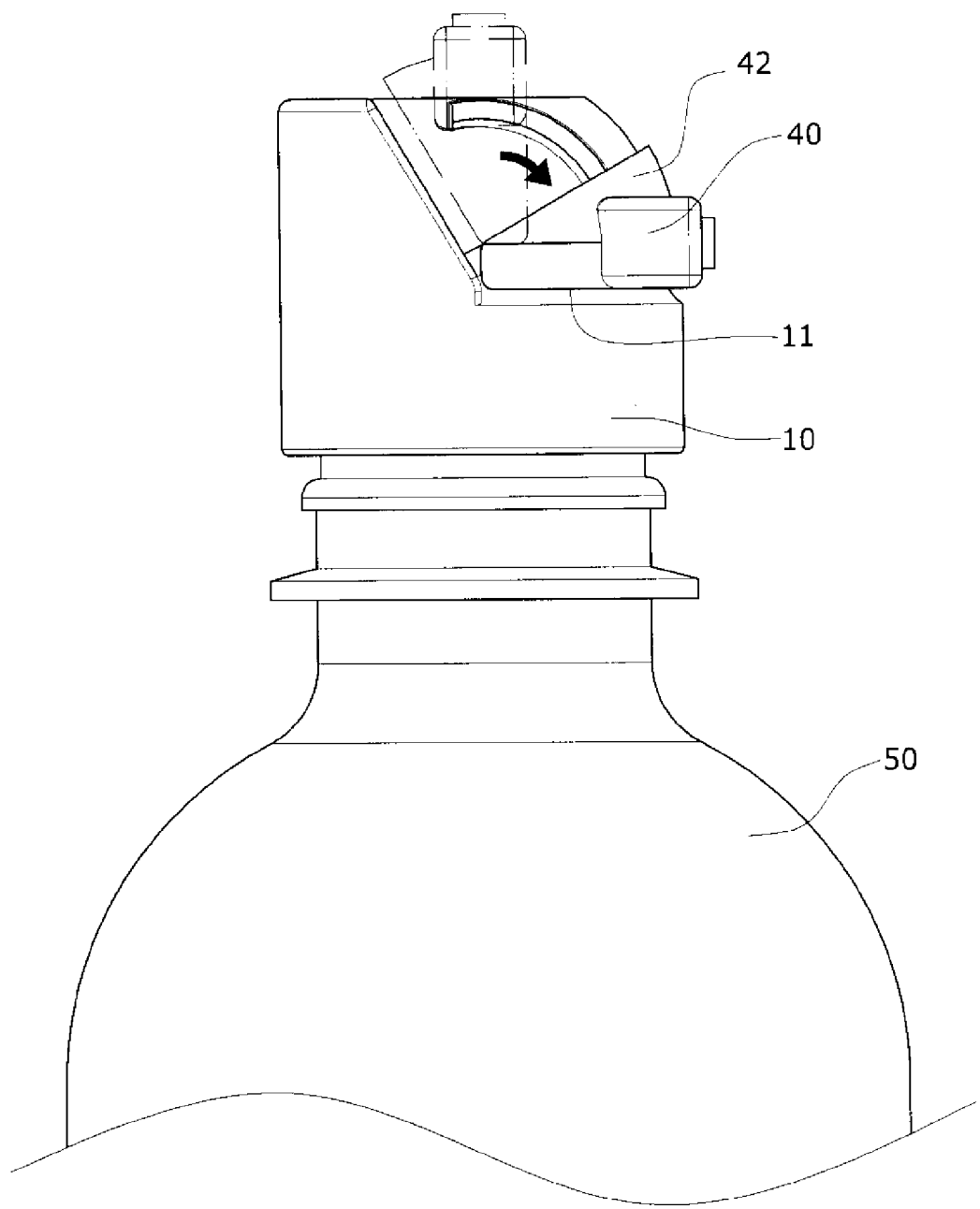
FIG. 4 is a perspective view of the preferred embodiment of the present invention installed on a container and set in an open condition.
Figure 5:
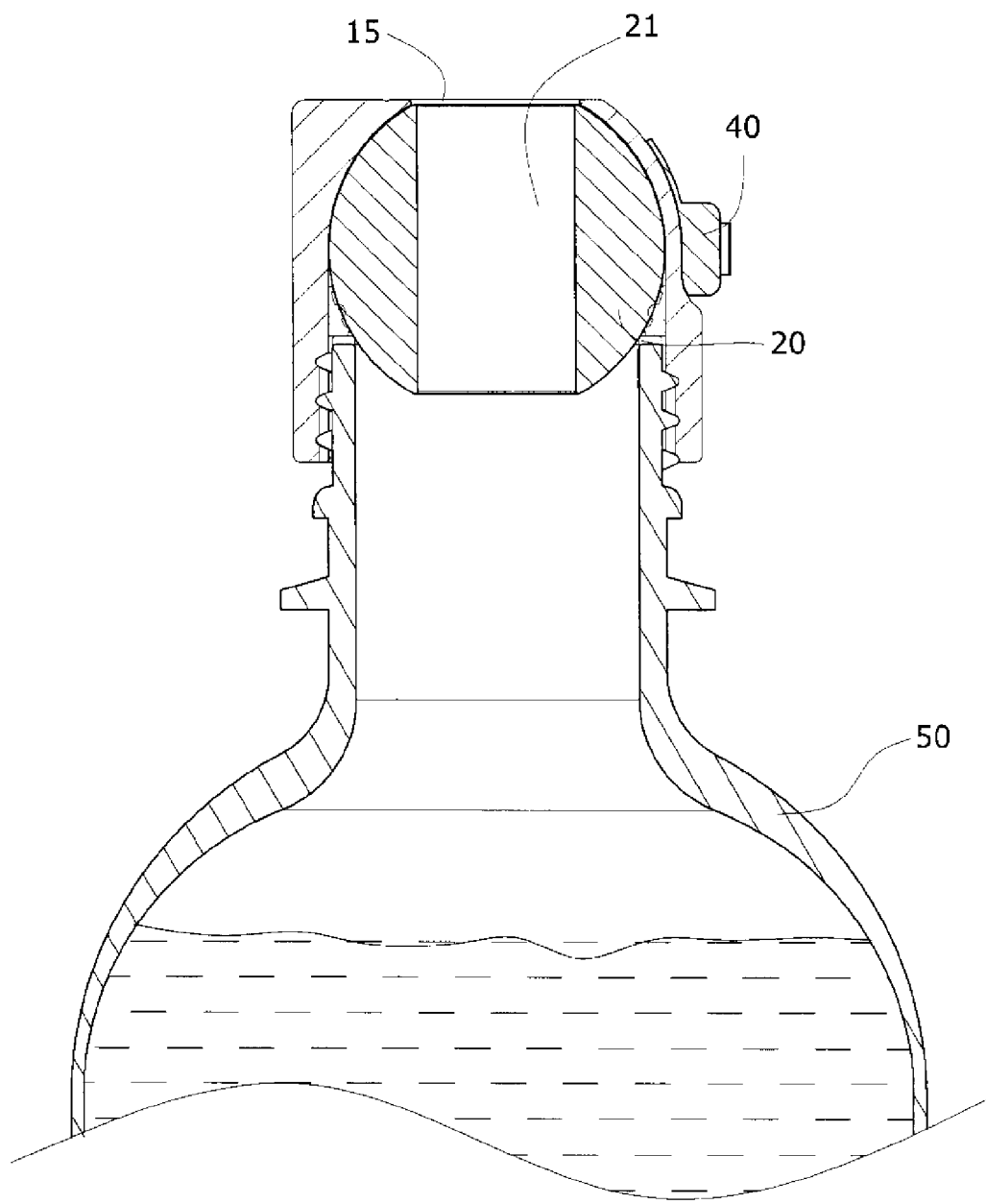
FIG. 5 is a cross-sectional view illustrating the open condition of the preferred embodiment of the present invention.
Figure 6:
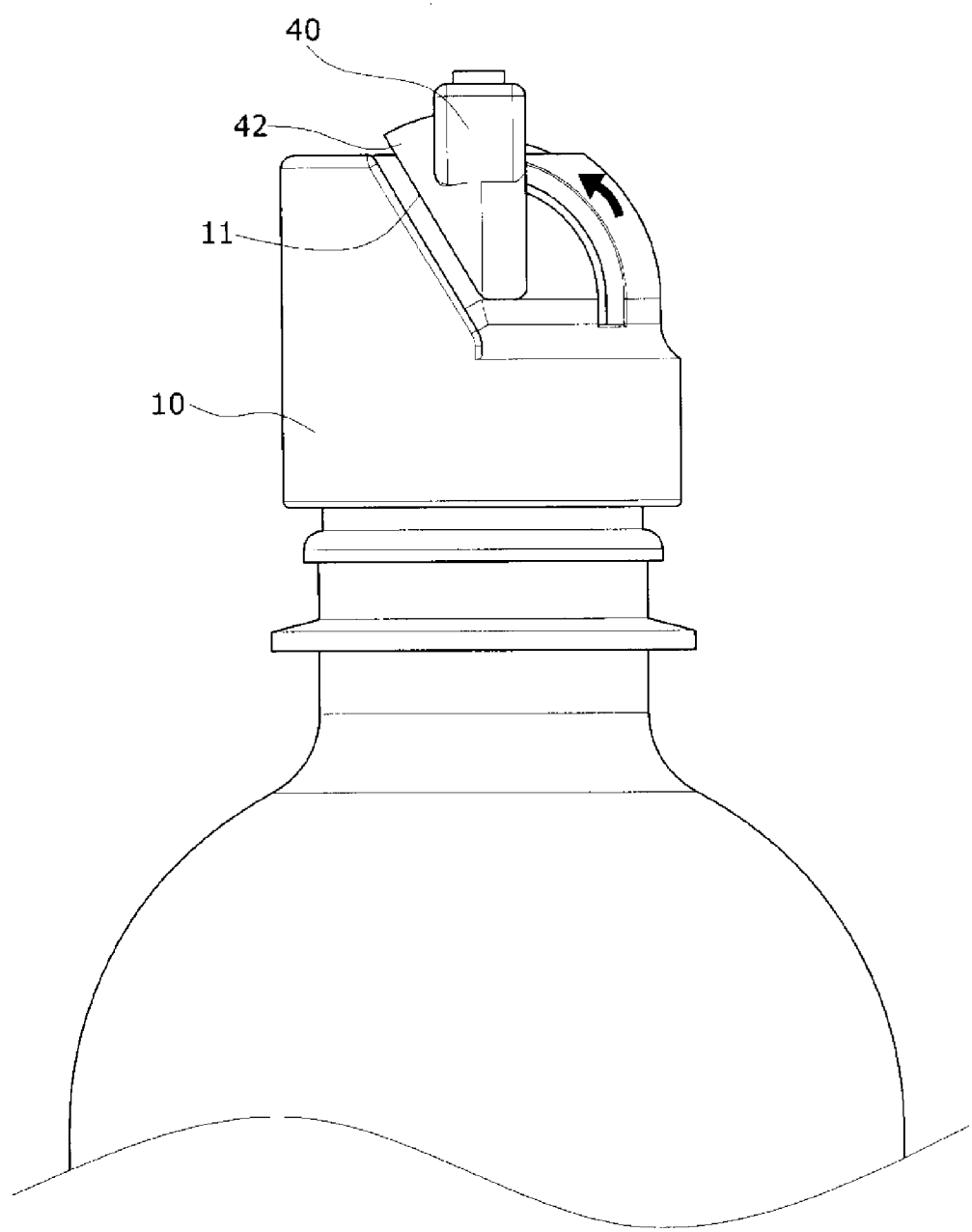
FIG. 6 is a perspective view of the preferred embodiment of the present invention installed on a container and set in a closed condition.
Figure 7:
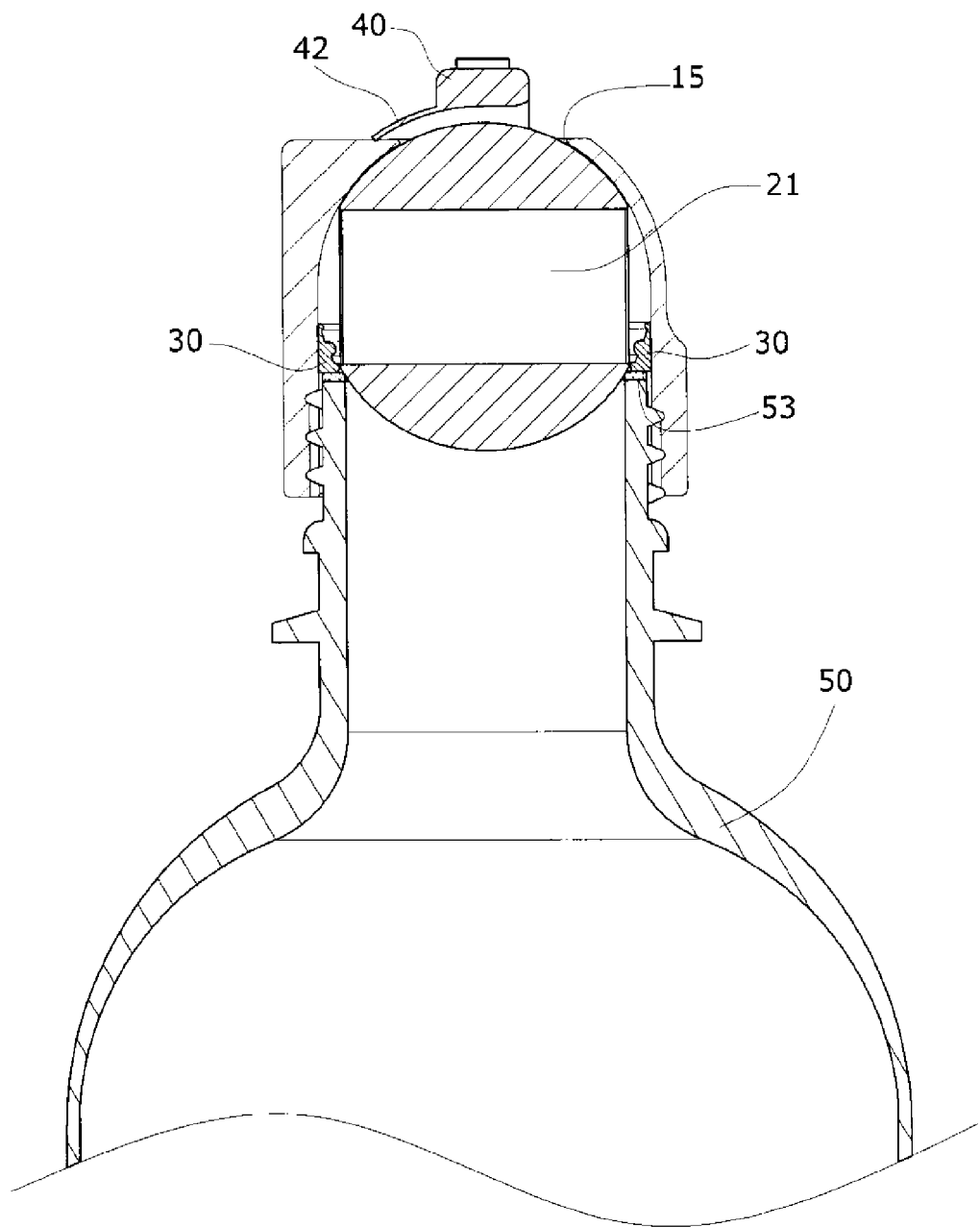
FIG. 7 is a cross-sectional view illustrating the closed condition of the preferred embodiment of the present invention.

With reference to the drawings and in particular to FIGS. 1-3, a flow control device constructed in accordance with the present invention comprises the following constituent components:

A hood 10 has a semi-spherical top having a hemispherical outer contour forming two stops 11 on two spaced portions. The hood 10 forms an interior receiving space 12 that has a hemispherical shape substantially similar to the outer contour. The receiving space 12 has an inside wall forming a thread 13 adjacent to an open end thereof. Two grooves 14 are formed on the inside wall of the receiving space 12 to be symmetric and opposite to each other. The top of the hood 10 forms a discharge opening 15. The hood 10 also forms, in an outer surface thereof, two arc positioning slots 16 on opposite sides of the discharge opening 15. The discharge opening 15 is in fluid communication with the receiving space 12. Further, a circumferential groove 17 is formed in the inside wall of the receiving space 12 above the thread 13.

A ball valve 20 has a center through which a channel serving as a flow passage 21 is defined. Positioning bosses 22 are formed from on an outer surface of the ball valve 20 at symmetric location and extends in opposite directions that are substantially perpendicular to the flow passage 21. As shown in the drawings, the positioning bosses 22 of the present invention can be made hemispherical or cylindrical and the positioning bosses 22 of the ball valve 20 are positioned in the hood 10 by being received in and moved along the grooves 14, whereby the ball valve 20 is rotatable within the receiving space 12 of the hood 10 with the positioning bosses 22 serving as a rotational axis. The ball valve 20 also forms two retention hooks 23 on opposite side of the flow passage 21 to correspond to the arc positioning slots 16. The flow passage 21 of the ball valve 20 is arranged at a 90 degree angle with respect to the retention hooks 23. When the ball valve 20 is received in the hood 10, the retention hooks 23 project out of the hood 10 by extending through the arc positioning slots 16 respectively, whereby the retention hooks 23 of the ball valve 20 are movable along the arc positioning slots 16 within a movement range defined by the arc positioning slots 16. Thus, the ball valve 20 is rotatable, in a limited manner, inside the hood 10 to communicate/block the flow passage 21 with/from the discharge opening 15 in accordance with the rotation thereof. Further, as shown in the enlarged drawing of FIG. 3, a circumferential rib 121 is formed on the inside wall of the receiving space 12 adjacent to the discharge opening 15. The circumferential rib 121 has a semi-circular cross-section to serve as a contact point between the hood 10 and the ball valve 20 so as to provide a tight fitting between the ball valve 20 and the hood 10, which makes he hood 10 tightly enclose and fit over the ball valve 20 to effectively share the stress applied to the positioning bosses 22, and also increase a force that depresses down the positioning bosses 22 to allow the ball valve 20 to easily and tightly abut against a sealing ring 3. The circumferential rib 121 and the hood 10 form a line contact therebetween, which educes the frictional force induced against the rotation of the ball valve 20 inside the hood 10, making the rotation of the ball valve 20 smooth.

The sealing ring 30 forms a curved face 31 corresponding to the outer spherical configuration of the ball valve 20. The sealing ring 30 is set in the circumferential groove 17 of the hood 10 with the curved face 31 of the sealing ring 30 tightly resting against the outer surface of the ball valve 20 for sealing the receiving space 12 of the hood 10 and thus preventing liquid from flowing or leaking outward.

A handle 40 has a central portion forming two coupling holes 41 and having a bottom that defines a spherical curved face 42. To assemble, the 40 of the handle 40 are respectively fit over and coupled to the retention hooks 23 of the ball valve 20 that project out of the hood 10 so that the handle 40 and the ball valve 20 are movable together. The curved face 42 of the handle 40 encloses the outer surface of the hood 10 in a movable manner whereby opposite side walls of the curved face 42 of the handle 40 are selectively engageable with the two stops 11 formed on the outer surface of the hood 10 to set open and closed positions of the handle 40 and the ball valve 20. In the embodiment illustrated in the drawings the two stops 11 are angularly spaced by an angle greater than 90 degrees.

To assemble, the instant embodiment uses the thread 13 inside the hood 10 to threadingly engage and thus house an external thread 52 of a mouth 51 of a container 50, such as a PET bottle, so as to be attached to the container 50 to replace a bottle cap that is originally set on the mouth of the container. This installation process is simple and easy. A rubber/plastic ring 53 is set between the mouth 51 of the container 50 and the hood 10 to ensure leak-proof sealing therebetween.

To use, as shown in FIGS. 4-7, to dispense liquid from the container 50, the handle 40 is rotated in a downward direction until the retention hooks 23 of the ball valve 20 engage lower ends of the arc positioning slots 16 and one side wall of the curved face 42 of the handle 40 is stopped by the lower-side stop 11 of the hood 10, a double stop arrangement being thus realized to stop further rotation of the ball valve 20. This not only exposes the discharge opening 15 of the hood 10 but also sets the flow passage 21 of the ball valve 20 in communication with both the discharge opening 15 of the hood 10 and an interior space of the container 50 whereby a user is allowed to directly retrieve the liquid out of the container 50 and this is done by the user using a single hand driving the handle. Thus, the operation is easy and simple. On the other hand, to close, the handle 40 is driven in an opposite direction, namely moving the handle 40 in an upward direction until the retention hooks 23 engage upper ends of the arc positioning slots 16 and the opposite side wall of the curved face 42 of the 40 is stopped by the upper-side stop 11 of the hood 10, by which the rotation of the ball valve 20 in the opposite direction is stopped, whereby the discharge opening 15 of the hood 10 is partially covered and the flow passage 21 of the ball valve 20 is no longer in communication with the discharge opening 15 and the interior space of the container 50. (The flow passage 21 of the ball valve 20 may even in a condition that it is perpendicular to a central axis of the hood 10.) Since the ball valve 20 is completely sealed against the hood 10 by the sealing ring 30 and the rubber/plastic ring 53. The ball valve 20 can thus be completely closed. The operation is also easy and simple and no leakage may occur.

Figure 8:
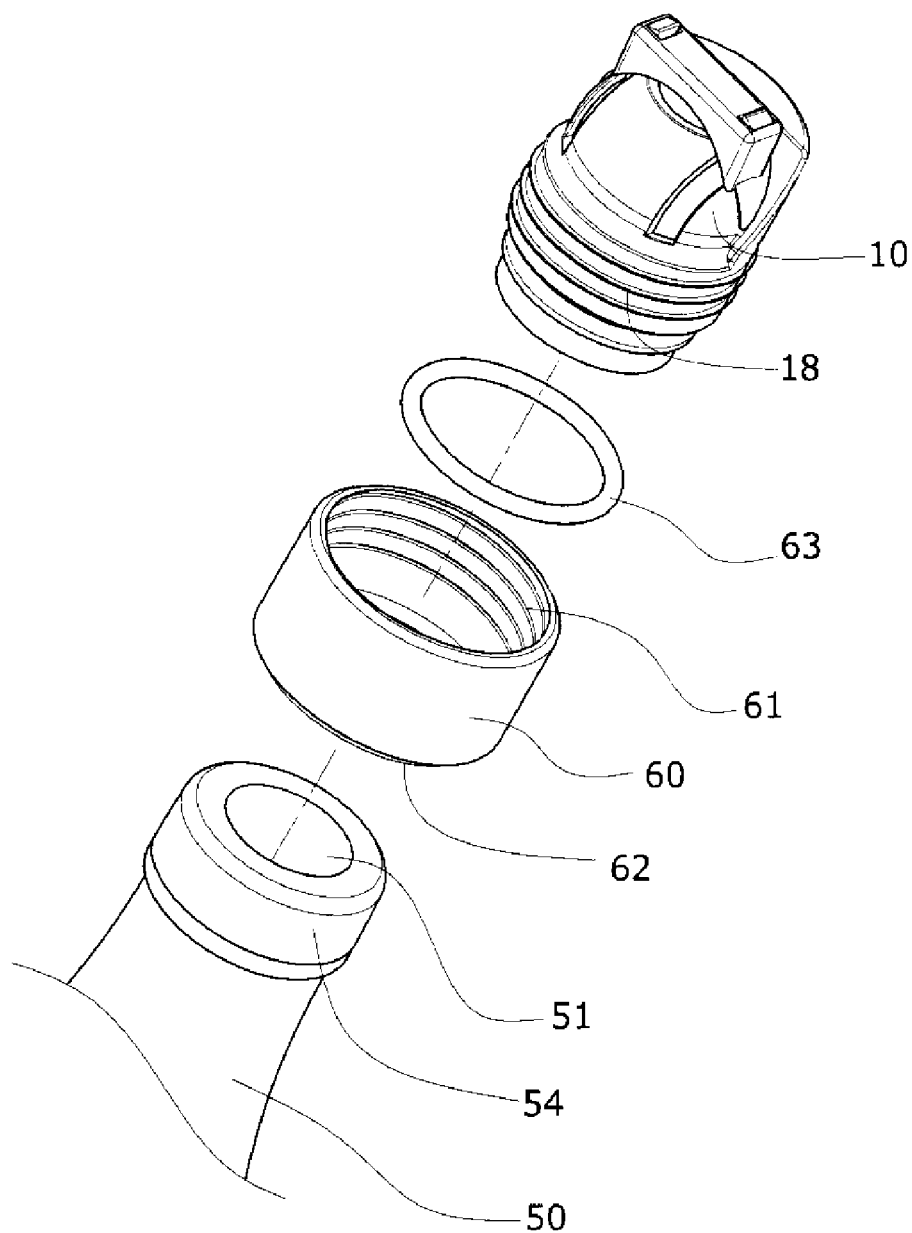
FIG. 8 is an exploded view of another embodiment of the present invention mounted to a bottle mouth.
Figure 9:
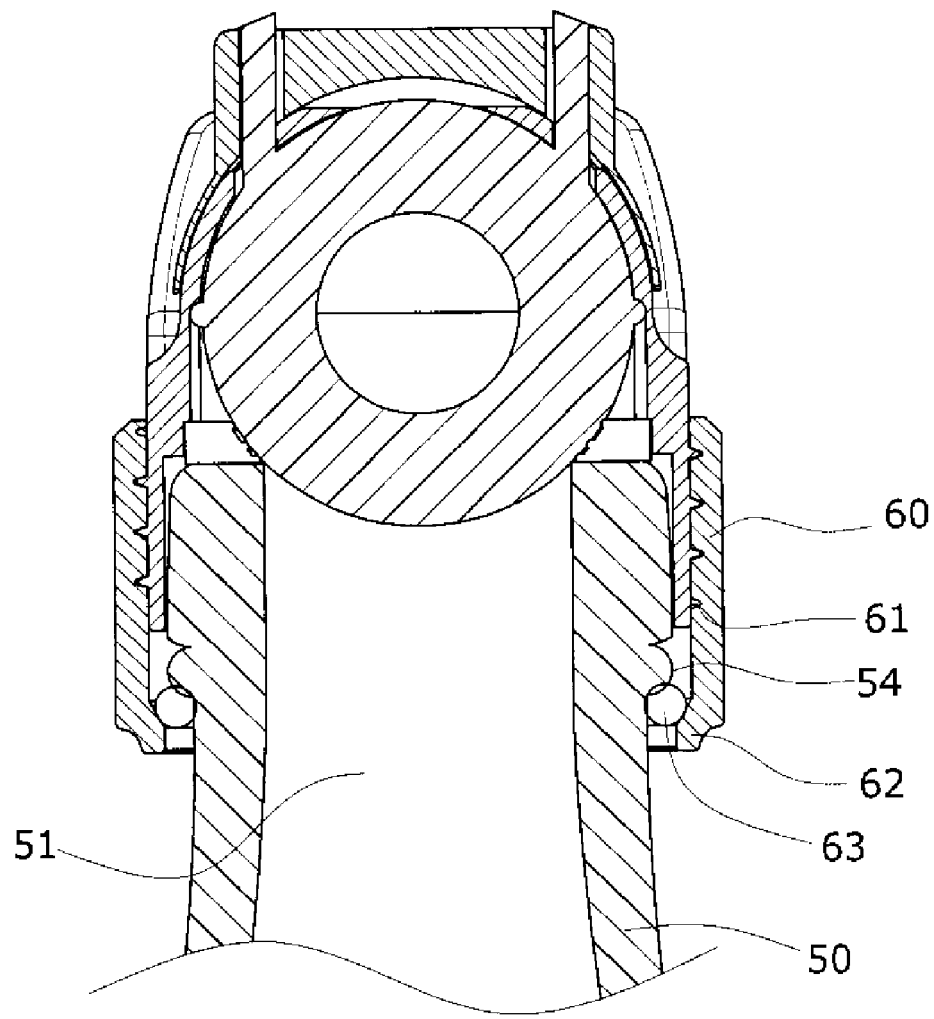
FIG. 9 is a cross-sectional view of FIG. 8 in an assembled form.
Figure 10:
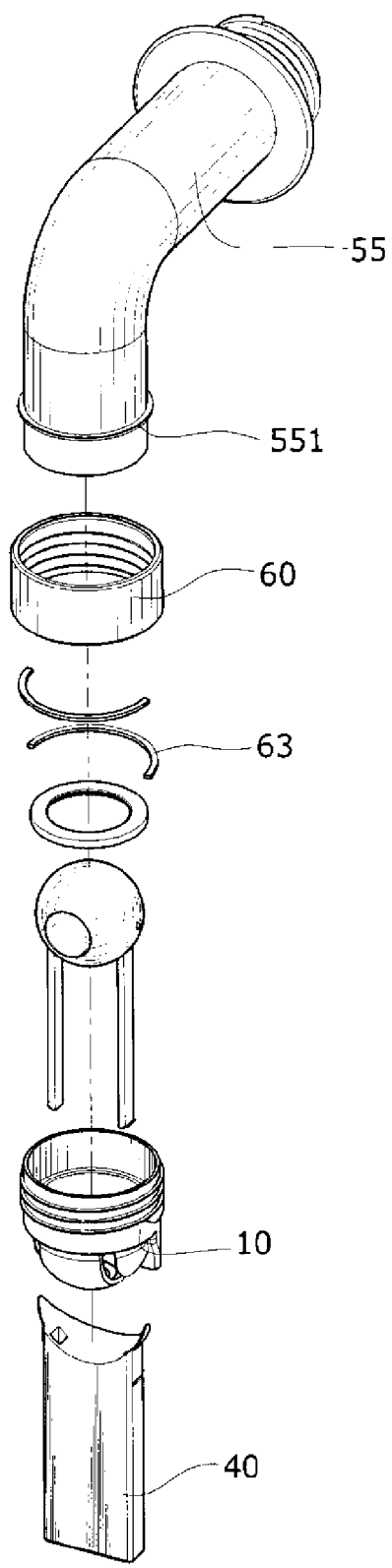
FIG. 10 is an exploded view of a further embodiment of the present invention mounted to a liquid outlet tube.
Figure 11:
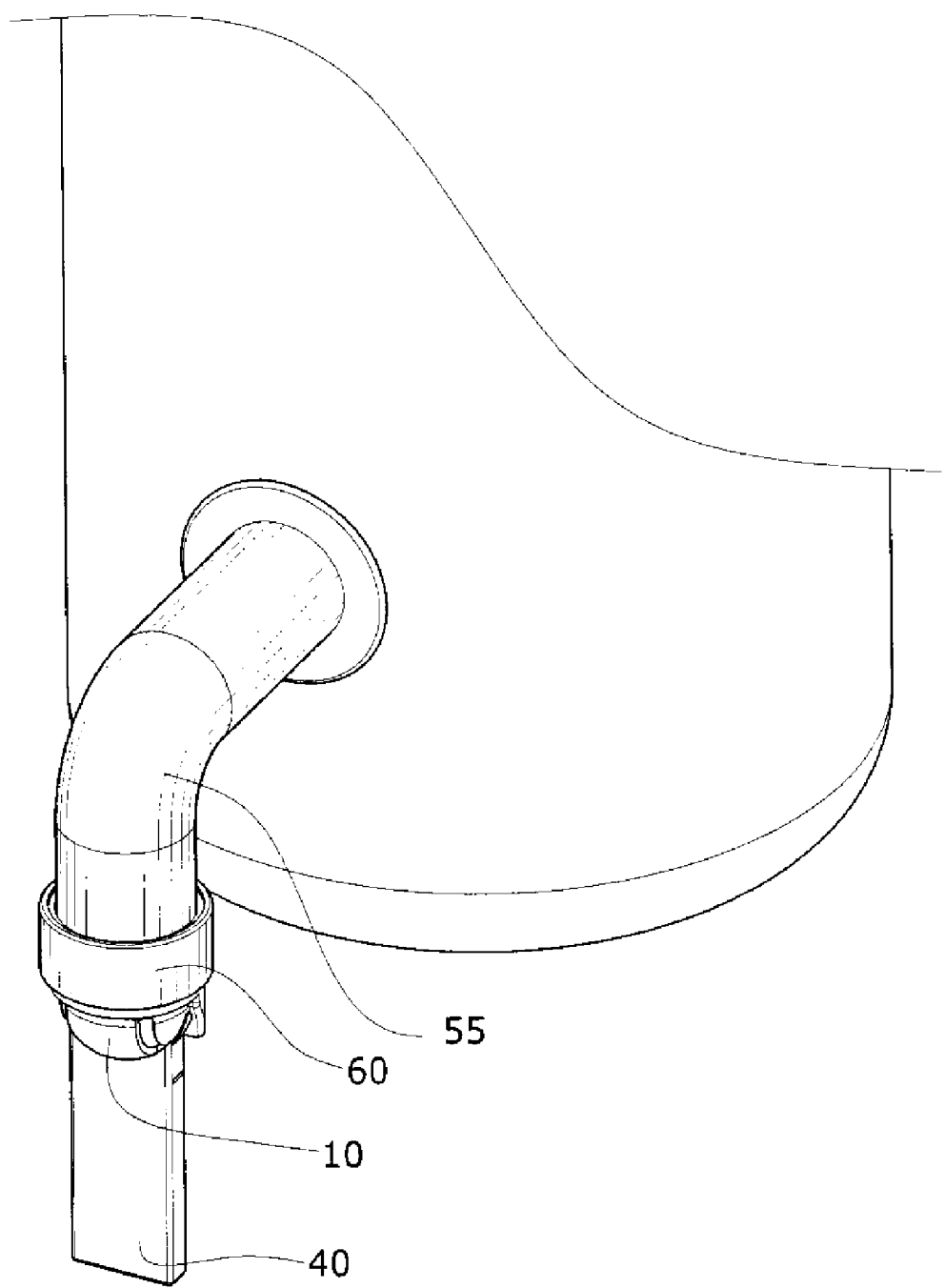
FIG. 11 is a perspective view of FIG. 10.

Referring to FIGS. 8 and 9, another embodiment in accordance with the present invention is shown, wherein the hood 10 has an outer cylindrical surface forming an external thread 18 that functions to threadingly engage a collar 60 that has an inside wall forming an inner thread 61. The collar 60 has a lower reduced flange forming a neck 62 that has an inside diameter smaller than that of the collar 60. A washer ring 63 is set inside the neck 62 and the washer ring 63 has a proper hardness and forms a notch for facilitating fitting and providing a desired extendibility. The instant embodiment aims to serve a container 50 that has a mount 51 forming no thread 52 but having a rigid circumferential flange 54, such as a glass bottle. The neck 62 of the collar 60 is first fit over an outer wall of the mouth 51 and the washer ring 63 is then fit over the outer wall of the mouth 51 and received in the collar 60. The hood 10 may afterwards threadingly engages the collar 60 and with the neck 62 being set against the circumferential flange 54 through the washer ring 63, during the course of the threading engagement, the hood 10 is gradually driven downward to tightly fit to the mouth 51, so as to couple the present invention to the mouth 51 of the container. With the ball valve 20 in tight engagement with the sealing ring 30 and rubber/plastic ring 53, effective sealing against leakage or penetration of liquid can be realized. The installation and operation are also easy and simple. Further, as shown in FIGS. 10 and 11, the above discussed structure can also be applied to a liquid tank, such a temperature preservation tank, by being mounted to a dispense outlet tube 55, wherein the outlet tube 55 has an outer wall forming a circumferential flange 551 adjacent to an open end thereof for supporting a collar 60 and a washer ring 63. As shown, in the instant embodiment, the washer ring 63 is comprised of two cut halves of a metal ring. Such a construction of the washer ring 63 provides the same function as the previously discussed washer ring in the previous embodiment. When a neck 62 of the collar 60 is set around the circumferential flange 551, the necks 62 uses its seating on the washer ring 63 to tightly abut against the circumferential flange 551, whereby during the course of the threading engagement of the hood 10 and the collar 60, the hood 10 is gradually driven downward to tightly fit to the open end of the outlet tube 55 to thereby complete the installation. Thus, the installation is easy and simple. Further, in the application of installation to a faucet of a temperature preservation tank, the length of the handle 40 must be increased in order to facilitate the operation by a user.

Figure 12:
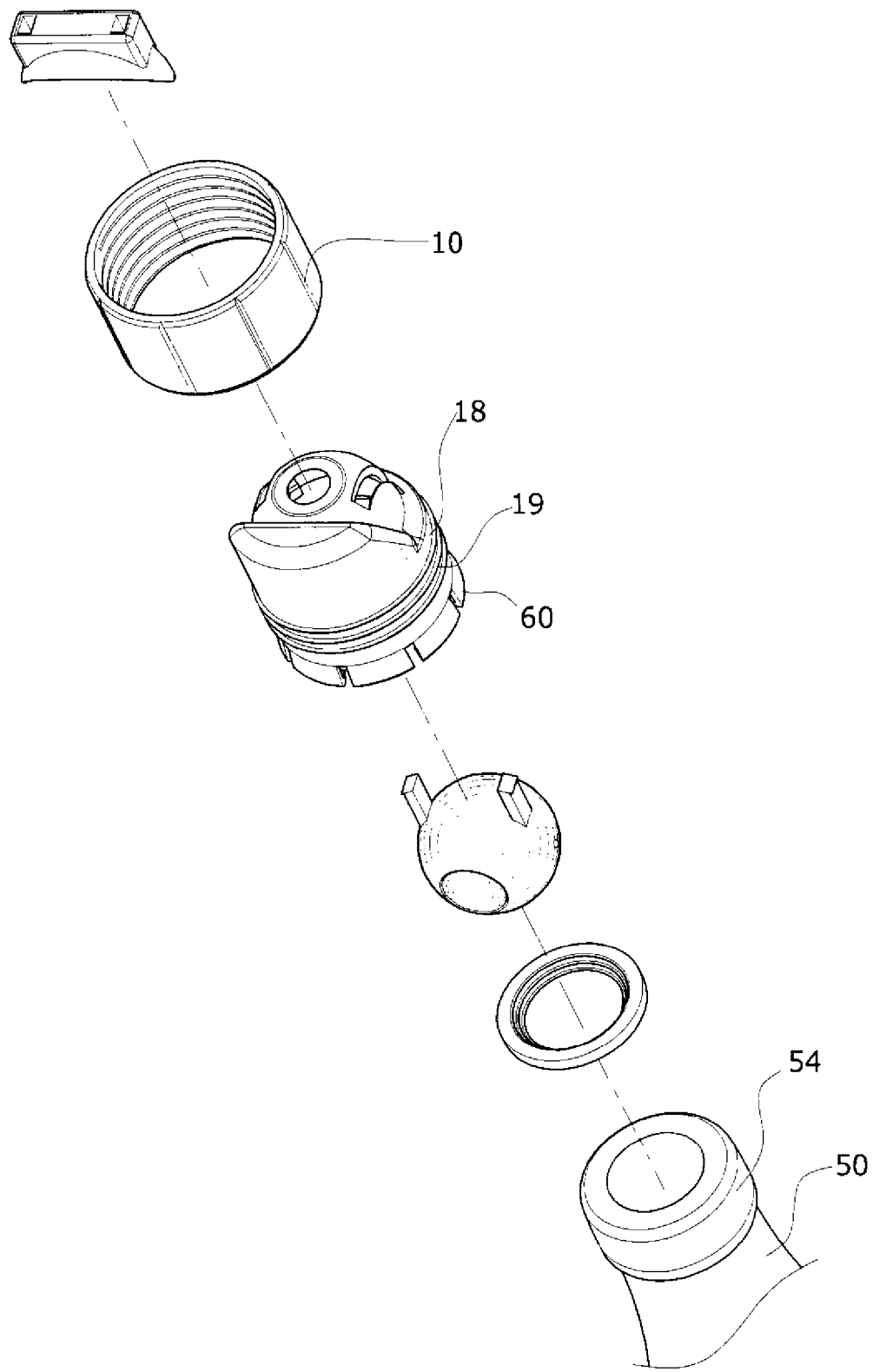
FIG. 12 is an exploded view of yet a further embodiment of the present invention mounted to a bottle mouth.
Figure 13:
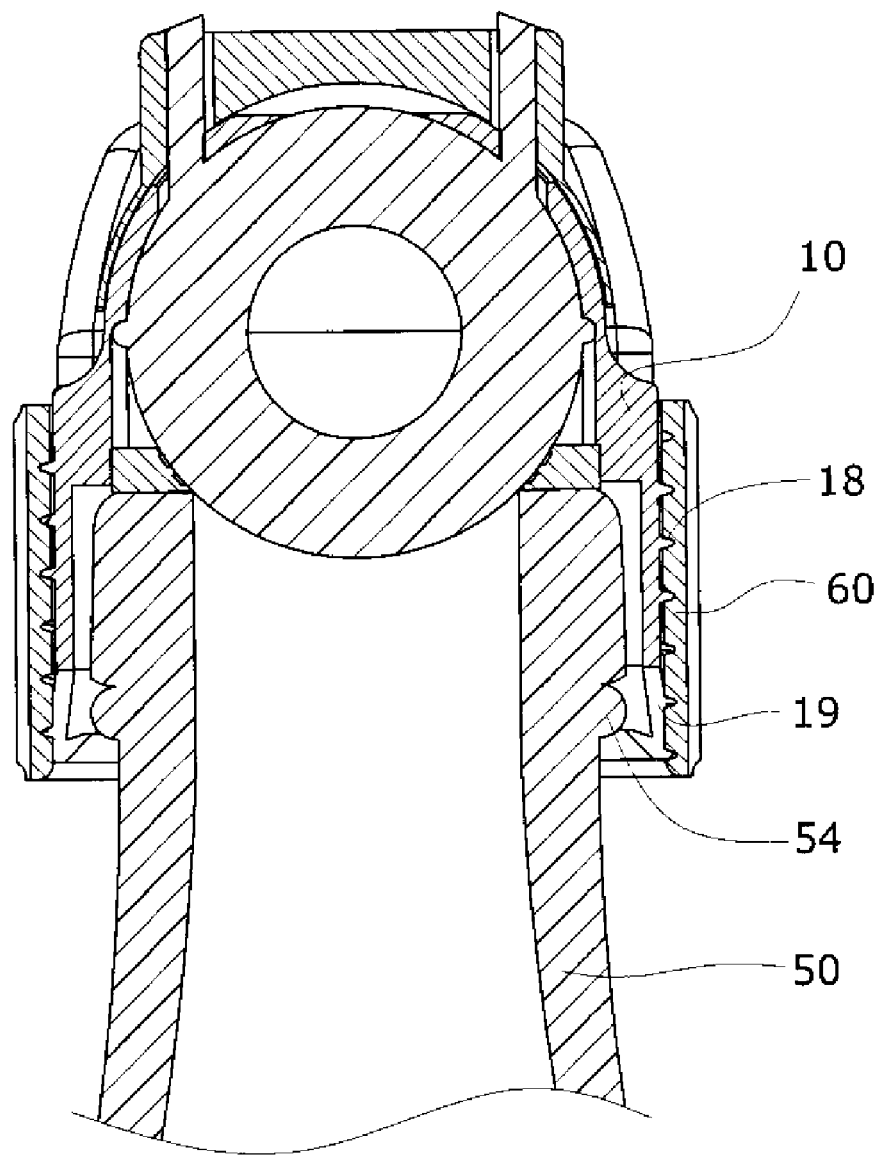
FIG. 13 is a cross-sectional view of FIG. 12 in an assembled form.

Further, referring to FIGS. 12 and 13, a further embodiment of the present invention is illustrated, wherein the hood 10 has a cylindrical outer wall forming an external read 18 adjacent to an open end thereof and also forming at a lower end thereof a plurality of resilient barbs 19, whereby in an application to a container 50 having a circumferential flange 54, the collar 60 can be set in threading engagement with the external thread 18 of the hood 10 to inward drive the barbs 19, making the barbs 19 gripping the circumferential flange 54 of the container 50 to complete the installation. The convenience of installation is thus enhanced.

Based on the above discussion, as shown in FIGS. 1-13, the present invention offers the following advantages:

(1) The present invention provides a hood 10 containing therein a ball valve 20 that is movable in unison with a handle 40 so that when the ball valve 20 is caused to do an angle-limited rotation inside the hood 10, a discharge opening 15 is controlled to be selectively in communication with a flow passage 21 of the ball valve 20, whereby a single hand operation of selectively setting a liquid dispensing condition can be realized, remarkably enhancing the convenience of operation.

(2) Further, the hood 10 of the present invention is provided with and operable with a collar 60 by which the convenience of installation is enhanced and wide application to mouths 51 of various containers 50 and/or liquid outlet tubes 55 can be realized.

(3) The present invention provides a hood 10 that forms barbs 19 for gripping a mount 51 of a container 50 or a liquid outlet tube 55 when undergoing reading engagement with a collar 60, whereby convenience of installation is enhanced.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A flow control device, comprising:
   a hood, which has a hemi-spherical shape and internally forms an interior receiving space, the hood forming in a top thereof a discharge opening, the hood forming two arc positioning slots in an outer surface thereof on opposite sides of the discharge opening;
   a ball valve movably received in the hood, the ball valve forming through a center thereof a flow passage, the ball valve having an outer surface forming two positioning bosses at two symmetric locations substantially perpendicular to the flow passage, the ball valve forming two retention hooks on opposite side of the flow passage to correspond to the arc positioning slots so that when the ball valve is received in the hood, the retention hooks project out of the hood by extending through the arc positioning slots respectively;
   a sealing ring set inside the hood and enclosing the outer surface of the ball valve; and
   a handle, which is coupled to the retention hooks and has a central portion forming two coupling holes for engaging the retention hooks of the ball valve projecting out of the hood so as to allow the handle to move in unison with the ball valve.

2. The flow control device according to claim 1, wherein the hood forms an internal thread in an inside wall thereof adjacent to an open end.

3. The flow control device according to claim 1, wherein the hood has an outer cylindrical surface forming an external thread adjacent to an open end thereof.

4. The flow control device according to claim 3, wherein the external thread of the outer surface of the hood is threadingly coupled to a collar that has an inside wall forming an inner thread.

5. The flow control device according to claim 4, wherein the collar has a lower reduced flange forming a neck that has an inside diameter smaller than that of the collar, a washer ring being set inside the neck.

6. The flow control device according to claim 1, wherein the hood has a lower end forming a plurality of barbs, whereby when the collar is set in threading engagement with the external thread of the hood, the barbs are forced inward.

7. The flow control device according to claim 1, wherein the flow passage of the ball valve is arranged at a 90 degree angle with respect to the retention hooks.

8. The flow control device according to claim 1, wherein the inside wall of the receiving space form two symmetric grooves.

9. The flow control device according to claim 1, wherein the hood forms therein a circumferential groove for receiving the sealing ring.

10. The flow control device according to claim 1, wherein the handle forms a spherical curved face enclosing the outer surface of the hood.

11. The flow control device according to claim 1, wherein the hood forms two stops on two spaced portions thereof for respectively stopping opposite side walls of the spherical curved face of the handle.

12. The flow control device according to claim 1, wherein a rubber ring is set between a container mouth and the sealing ring.

* * * * *